Nov. 19, 1929.  J. F. ROBB  1,736,751
MIXING MACHINE CONTROL SIGNALING INDICATOR
Filed April 13, 1928  2 Sheets-Sheet 1
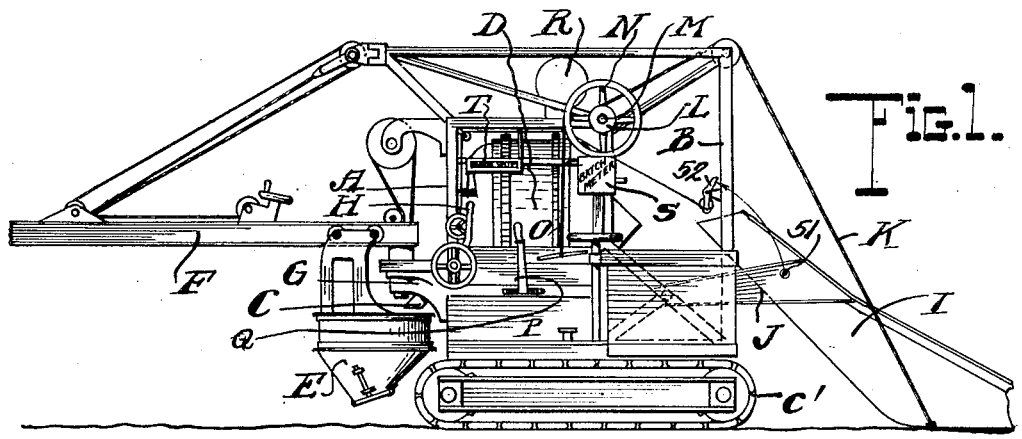
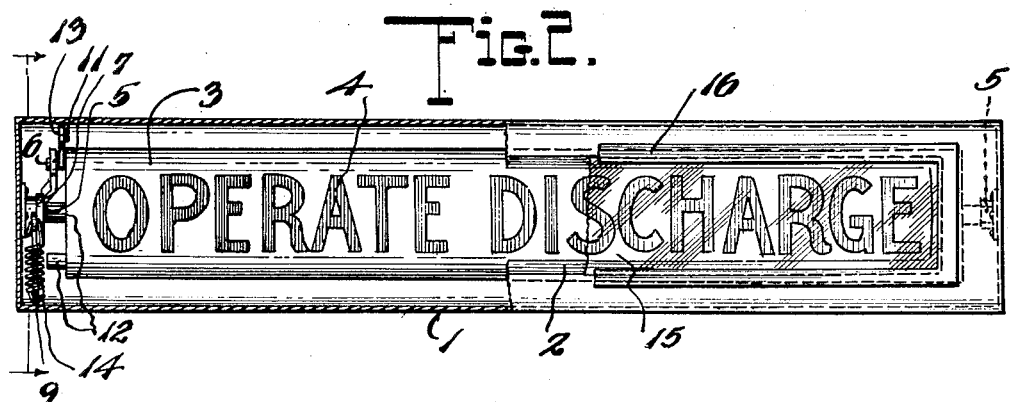
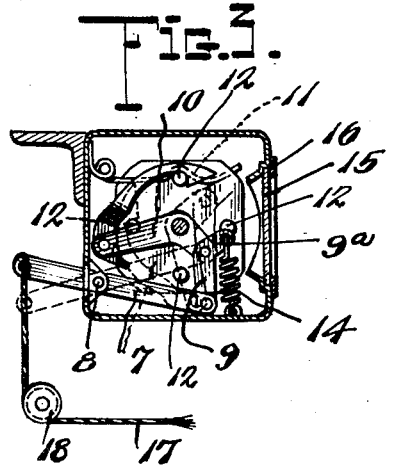
Inventor
John F. Robb
By Robt F Robb
Attorneys

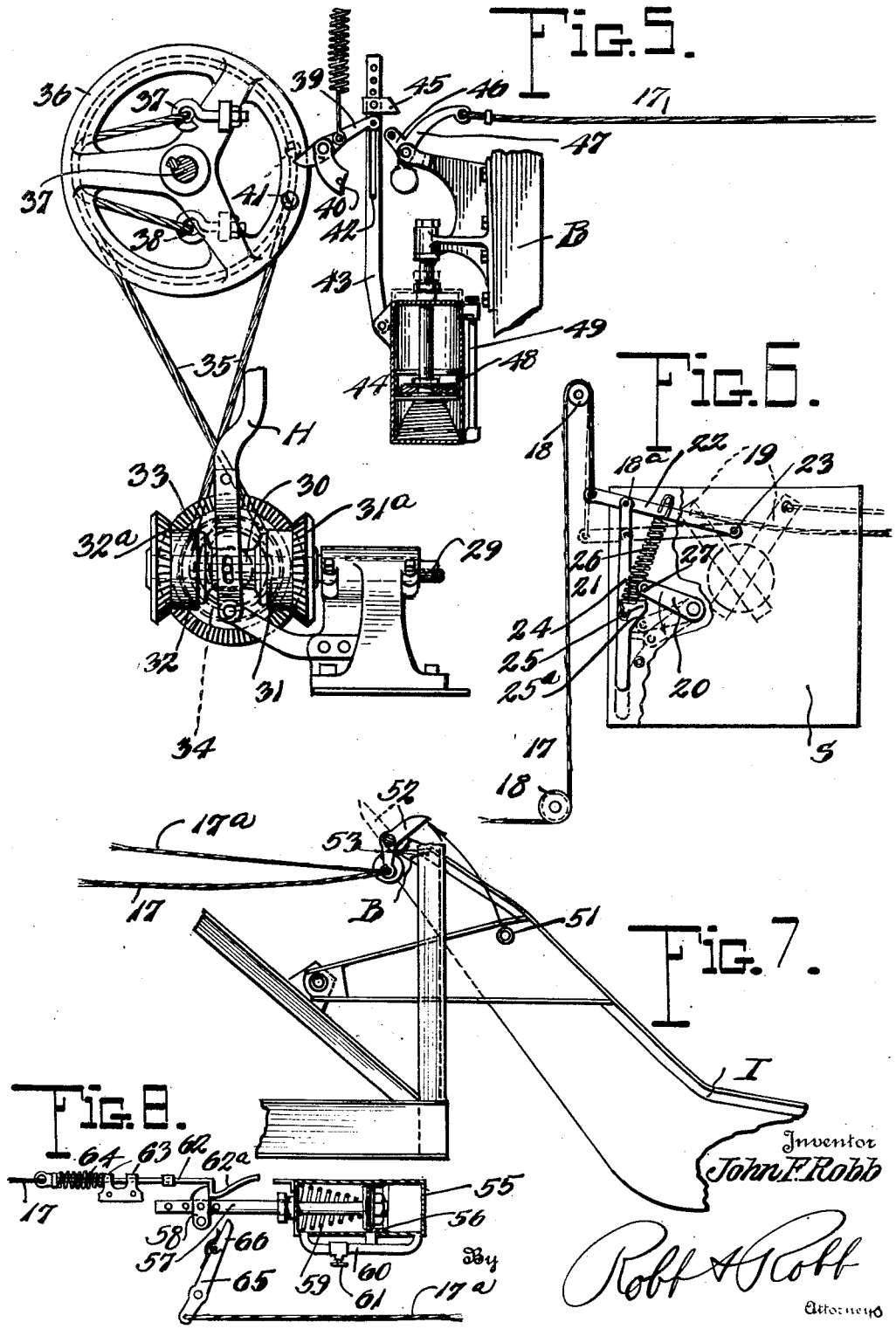

Patented Nov. 19, 1929

1,736,751

UNITED STATES PATENT OFFICE

JOHN F. ROBB, OF CLEVELAND, OHIO, ASSIGNOR TO KOEHRING COMPANY, OF MILWAUKEE, WISCONSIN, A CORPORATION

MIXING-MACHINE-CONTROL SIGNALING INDICATOR

Application filed April 13, 1928. Serial No. 269,843.

In the operation of concrete mixers, especially those of the paver type, it has been found that their efficiency depends materially upon the precision with which the operator carries out the several manually controlled functions of the mixer. An efficient operator can by proper operation of the controls effect the maximum output of the machine, but it has been found by actual practice that this desired operation is rarely obtained, since it requires not only the prompt operation of the several controls but special coordination of their operative functions, including the overlapping of certain of the operations.

I have proposed heretofore to obtain the foregoing desired efficient operation of a concrete mixing machine by the provision of certain control mechanisms which are initially put into operation by the operator of the mixer, said mechanisms have coacting parts for carrying out automatically in synchronized action or in proper sequence, the several functions of the paving machine. An instance of this kind is disclosed in my recently issued Letters Patent No. 1,660,301, granted February 21, 1928, wherein is provided a mechanism which, when set into operation not only causes the complete cycle of operation of the several parts of the paver in proper sequence but also causes certain of these cycles to be properly overlapped or synchronized to produce a machine of the highest efficiency.

Machines of the last mentioned type must necessarily be built or equipped at the factory because the control mechanism is somewhat complicated and care must be exercised in installation. My present invention may be attached to present paving or mixing machines, and provides especially a visual indicator to inform the operator as to the times he should manually operate the different parts of the machine for the highest efficiency.

The cycle of operation of any of the modern types of concrete mixer paving machines is approximately as follows, assuming of course that the supply of aggregates and materials is sufficient to meet the mixer's requirements:

The time required to raise the skip to full elevated position is about 10½ seconds. After reaching this position the skip must be held so elevated for about 9½ seconds in order to provide sufficient time for a complete emptying of the aggregates therefrom into the mixing drum. About 3 seconds is required to lower the skip to the ground or grade position, ready for reloading with the aggregates necessary to make up the proper mixture for the next batch, water of course being excluded since this is now automatically supplied to the mixing drum at the proper time during the elevation of the skip. The time required to supply this water varies materially in the several different types of mixers, a modern paver for instance, requiring less than 10 seconds. The time required for mixing is generally 60 seconds and is usually determined by a control mechanism known generally as a batchmeter.

An example of one of these mechanisms is disclosed in the patent to Robb No. 1,370,497 of March 1st, 1921, and Winkler No. 1,451,483 of April 10th, 1923.

The time required to discharge the batch of concrete from the mixing drum is about 13½ seconds. The time required for the incoming aggregates from the skip to pass through and begin to discharge from the other side of the mixing drum is about 3 seconds, while the actual operation or oscillation of the discharge chute takes about 1½ seconds, using a conventional type of power discharge.

It is an object of my invention to provide an indicating device for automatically indicating to the operator of the mixer in proper sequence the several operations of the mixer, whereby the operator can by following out these indicated operations cause the machine to function in the most efficient manner, without time losses in between the various sequential actions of the various mechanisms.

A further object of my invention is to provide an indicator of the changeable exhibitor type cooperating with certain parts of the mixing machines whereby to indicate to the operator in proper sequence the time when certain manual controls are to be moved by him, the manual controls causing certain cycles of operation of the mixer to take place, whereupon certain means cooperate with the indicator to change the indicator to indicate the subsequent necessary operations.

A still further object of my invention is to provide an indicating mechanism for concrete paving machines and their like to inform the operator of such machines regarding the exact period of time when he must move certain manual controls to produce certain operative functions of the paver, these operative functions in turn cooperating with informing or indicator means in such a way that the latter will be again shifted to indicate to the operator the exact period when other controls must be operated to produce further subsequent operations of other parts of the paving machine.

Another object of my invention is to provide an indicator for concrete mixing machines cooperating with the mixing machine in such a manner that after certain controls are manually operated by the operator of the machine, the indicator will be caused to shift to indicate further operations, these operations being so overlapped or synchronized as to produce a maximum output of the paver.

With reference to the drawings:

Fig. 1 is a side elevation of a concrete paving machine having my invention applied thereto;

Fig. 2 is a front elevation partly in section of a changeable exhibiting indicator of the type used by me in carrying out my invention;

Fig. 3 is a vertical sectional view on the line 3—3 of Fig. 2;

Fig. 4 is a developed plan view of the surface of the indicating roller disclosing certain indicia thereon;

Fig. 5 is a fragmentary view showing a portion of a power discharge mechanism such as is fully disclosed in patent of Lichtenberg No. 1,532,249 of April 7, 1925, and having added thereto a delayed action actuating mechanism forming a part of my invention applied thereto;

Fig. 6 is a fragmentary and diagrammatic view of a batchmeter of the type disclosed in patent, the Winkler patent supra, and having applied thereto an actuating mechanism for the indicator and forming a part of my invention;

Fig. 7 is a fragmentary detail view of a charging skip and a portion of the mixer frame showing an actuating mechanism for the indicator applied thereto and forming a part of my invention.

Fig. 8 is a detail view of the delayed control actuating mechanism for the indicator, operable by the skip.

In the drawings:

A represents a mixing machine of a known type, comprising a frame B supported by multiplane traction means C'. A discharge chute C is supported by the frame B and shiftable in one position to assist in the mixing operation within the mixing drum D and in another position to discharge the contents in said drum D into the bucket E movable along the boom F which is pivoted for horizontal swinging on the bracket G carried by the frame B. The discharge chute C is oscillated by a power operated mechanism under the manual control of the operator by a control lever H.

In order to load mixing drum D a loading skip I is provided, said skip being pivotally connected to the frame B by the bracket J. The skip I is raised by cables K which are wound on drums L keyed to the rotatable shaft M. The shaft M has also keyed thereto the drum wheel N adapted to be actuated by the cable O which is in turn connected to the skip hoist drum located in the casing P and under the control of the operator by the manually controlled lever Q. Water is supplied to the mixing drum D from the water measuring tank R by certain valves, piping, etc., in a well known manner and is not therefore shown in detail.

The batchmeter S is mounted on the frame B and actuated also in a well known manner and for this reason is not shown in detail. Letters Patent No. 1,451,483 issued to Winkler show a typical batchmeter useful for my invention. A visual indicator T is located on the frame B of the paver in any desired position but preferably in front of the operator as shown in Fig. 1. While I have shown only a simple type of indicator it is to be understood that if desirable the indicator may include an audible signal, and an illuminating means, thus permitting the machine to be used efficiently at night.

The visual indicator T comprises a casing 1, as shown in Figure 2, provided with an opening 2 in the front thereof through which the operator may view the roller 3 carrying the indicia 4. The roller 3 is suitably journaled at the ends of the casing 4 at 5—5 and is provided with an actuating mechanism that is generally indicated at 6.

The actuating mechanism 6, see Fig. 3, comprises in detail a lever 7 pivoted at 8 and connected by a link 9 to a second lever 10 pivoted intermediate its ends on the axis of the roller 3. The opposite end of the lever 10 has a pawl pivoted thereto adapted to engage pins 12 carried by the indicating roller 3. A holding spring 13 for the roller 3 is provided in order to keep the roller in proper relation with the opening 2, so that indicia can be properly viewed therethrough.

The link 9 has an offset portion 9ª to which is connected the return spring 14 for the actuating mechanism. A suitable transparent closure of glass, celluloid or the like for the opening 2 may be provided such as indicated at 15 and retained in place by the frame 16. Actuating cables 17 are connected to the lever 7 and pass therefrom over suitable pulleys 18 to different portions of the mixer A where certain other actuating mechanisms are located.

When one of the just referred to actuating mechanisms is put into operation due to the operator of the mixer moving certain controls, this actuating mechanism will cause the cable 17 to be pulled, rocking the lever 7, which in turn causes the pawl 11 to shift the roller 3, ninety degrees, as shown in Figure 3, the parts moving from the full line position to the dotted line position. Upon release of the cable 17 the actuating lever 7 will be returned again by the spring 14 to the full line position, as shown, the roller 3 having been shifted to show another one of a series of the progressive indications or indicia 4.

Referring to Figure 7 in which is disclosed one of the actuating mechanisms for the indicator T that is operatively connected to a batchmeter, which is of well known construction, and therefore its internal mechanism is not shown. The skip I in being elevated to a position for charging the drum D actuates a certain trip mechanism which in turn sets the batchmeter S by rocking the lever 19 thereon to the right, (see Fig. 6). This also causes the arm 20 to be rocked to the right or raised, as shown in full lines in Figure 6. At the end of a predetermined period of time the internal mechanism of the batchmeter permits these levers 19 and 20 to fly back to the initial position. At this time it is desirable to empty the mixing drum of the mixed batch of cement and in order to notify the attendant that this operation is then desirable I have provided the mechanism indicated generally at 21 on the batchmeter for actuating one of the pull ropes 17. The mechanism 21 consists in detail of a lever 22 pivoted at 23 and having its free end fastened to the cable 17. Pivoted intermediate the ends of the lever 22 is the depending rod 24 carrying a shoulder 25 and said shoulder terminating in a cam face 25$^a$. A return spring 26 is provided which cooperates to hold the actuating mechanism 21 in the position shown in full lines of Figure 6.

When the lever 20 is rocked to the left the pin 27 thereon engages the shoulder 25 causing the depending rod 24 to be pulled downwardly and since this rod is connected with the lever 22, this lever will also be moved downwardly, creating a pull on the cable 17.

A roller 28 is located in the path of the cam 25$^a$ and as the depending rod 24 moves downwardly this roller 28 by its engagement with the cam face 25$^a$ moves the shoulder 25 laterally to disengage it from the pin 27, thus permitting the spring 26 to return the lever 22 again to its initial position.

As the lever 20 swings to the right during the setting of the batchmeter, the pin 27 will by its engagement with the cam face 25$^a$ move the depending rod 24 laterally, thus permitting the pin 27 to again assume its initial position above the shoulder 25.

The operation of this mechanism just described due to the tripping of the batchmeter will cause the indicating roller 3 to move to a position as shown in Fig. 2, disclosing the sign "Operate discharge". The operator will thereupon shift the lever H which is the controlling element for the power discharge mechanism which is of a known type and disclosed in part in Fig. 6.

The shaft 29 is constantly rotating and carries splined thereto a clutch element 30 which is adapted to be shifted to the right or left to engage clutches 31 or 32 which in turn through the bevel gears 31$^a$ and 32$^a$ rotate the bevel gear 33 either to the right or left. The bevel gear 33 has fixed thereto a winding drum 34 around which the power discharge actuating cable 35 is wound. The ends of this actuating cable 35 are wound around the pulley drum 36 and fastened at 37 and 38 respectively. The drum 36 is key̆d to the shaft 37 which is operatively connected to the discharge chute C as shown diagrammatically in Fig. 5.

Since the elevation of the skip requires about 10½ seconds, while the time required to discharge the aggregates from the mixing drum is about 13½ seconds, and a slight period of time is required to turn the discharge chute from non-discharging position to discharging position, it is desirable to allow the discharge chute to remain in discharging position until the skip has been partially elevated and the materials begin to pour into the mixing drum. At this time however the operator must move the discharge lever H to cause the discharge chute to assume a non-discharging position, otherwise the materials would run completely through the drum and be discharged without proper mixing thereof.

Approximately 3½ seconds after the discharge chute has been moved to discharging position, the operator should "raise the skip" and the actuating mechanism for causing the indicator to shift its indicia to this sign is associated with the power discharging mechanism and generally indicated at 38. A lever 39 pivoted to the bracket 40 projecting from the frame B is adapted to be engaged by the pin 41 located on the pulley drum 36. The other end of the lever 39 carries a pin which projects into a slot 42 of the actuating rod 43 and is adapted to move the rod 43 upwardly upon rotation of the discharge chute to discharging position. This upward movement of rod 43 causes cylinder 44 to be moved vertically, also an adjustable abutment member 45 to be raised above the arm 46 of the pivoted cable actuating lever 47 for one of the leads of the cable 17.

The cylinder 44 and piston 48 constitute a delayed action mechanism and the fluid trapped above the piston being forced to return through a valve controlled by-passage 49, under pressure of the spring 50 will permit a relatively slow downward movement of the cylinder 44 and its connecting rod 43, thus causing the abutment 45 to gradually engage the extension 46 of the lever 47 causing in turn the cable 17 to be pulled and the actuation of the mechanism 6 to shift said indicia to disclose the sign "Raise skip."

The skip indicated at I has projecting therefrom a roller 51 which is adapted to engage during its upward travel a pivoted lever 52 supported by a bracket 53 from the frame B. The lever 52 is directly connected to the actuating mechanism 6 of the indicator by one of the cable leads 17 and 17$^a$.

Referring to Fig. 7 of the drawings, it will be seen that as the skip is elevated to discharge its contents of aggregates into the mixing drum, the roller 51 will engage the lever 52 rocking the same to the left and causing the cable 17 to be pulled which will in turn actuate the mechanism 6 of the indicator. This will cause the roller 3 to be turned to disclose to the operator the sign "Return discharge". The lever 52 also has connected thereto a delayed action mechanism 54 which is provided to permit a sufficient period of time to elapse after the raising of the skip for the materials to completely empty therefrom. This delayed action mechanism 54 will in turn cause the roller 3 to be shifted to disclose the sign "Lower skip".

The delayed action mechanism 54 is disclosed in detail in Figure 8 of the drawings and comprises a cylinder 55 containing a piston 56 to which is connected the piston rod 57. The piston rod carries adjustably mounted thereon a collar 58. The piston 56 is normally forced to the right hand end of the cylinder 55 by a coil spring 59. A by-pass 60 is provided connecting the opposite ends of the cylinder to regulate the flow of fluid therebetween and said flow is further governed by a regulative valve 61.

An actuating rod 62 for one of the cable leads 17 is suitably mounted in brackets 63 and normally held in non-engaging position with relation to the collar 58 by a compression spring 64. The rod 62 has a hooked extremity 62$^a$ terminating in a cam face 62$^b$.

Lever 65 pivoted intermediate its ends at 65$^a$ is adapted to be actuated by the cable 17$^a$ leading to the skip actuated lever 52. The opposite end of the lever 65 carries a one-way pawl 66 held in proper position by the spring 65$^b$. The collar 58 has a projecting pin 58$^a$ located in the path of the pawl 66.

As the skip in its ascent actuates the lever 52 the cable 17$^a$ causes the lever 65 to swing and the pawl 66 thereon engages the pin 58$^a$ of the collar 58 moving the piston 56 against the tension of the spring 59, to the opposite end of the cylinder 55. As the collar 58 is moved to the left, it engages the hooked extremity 62$^a$ of the rod 62. Further movement of the lever 65 causes the pawl extremity 66 to swing away from and disengage the pin 58$^a$ on the collar 58.

Thereupon the spring 59 causes opposite movement of the piston rod 57 said movement being retarded by the dash pot arrangement, the collar 58 carrying along with it the rod 62 causing the cable 17 to be pulled which in turn actuates the mechanism 6 of the indicator T. At the extreme inward movement of the piston the cammed extremity 62$^b$ of the rod 62 is caused to engage a bracket supported pin 55$^a$ which disengages the hooked extremity 62$^a$ and permits the spring 64 to return the rod 62 to its initial position.

The lever 65 is permitted to return to its initial position without causing any actuation of the rod 57 due to the particular arrangement of the one-way actuating pawl 66, said pawl necessarily pivoting and swinging past the pin 58$^a$ as the lever returns to its initial position.

Briefly describing the operation of the mechanism, we will assume that the mixing drum has a charge of materials therein and that the batchmeter is operating to control the mixing period. When the mixing period has elapsed, the batchmeter trips off, actuating the cable 17 which shifts the indicator T to disclose to the operator the sign "Operate discharge." The operator knows from this visual indication that the power discharge mechanism is to be operated and by movement of the control lever H sets this mechanism into motion.

The power discharge mechanism in its operation as disclosed in Fig. 5, engages and sets the delayed control dashpot device which after a sufficient time will cause one of the cables 17 to be pulled and in turn actuate the indicator to cause the sign "Raise skip" to be displayed.

This period of time between the operation of the discharge chute and initiating the skip raising is, as previously stated, about 3 seconds so as to overlap the discharge and skip raising actions. The operator thereupon knows it is now time to engage the skip hoist clutch, so he moves the control lever Q whereupon the skip will be elevated.

The skip in its elevating movement engages the actuating lever 52 which in turn directly causes a shifting of the indicator T to disclose the sign "Return discharge" and sets the delayed control dashpot mechanism as shown in Fig. 8, which subsequently functions to indicate to the operator of the mixer that it is time to operate the control necessary to lower the skip I. The skip I of course during its elevation sets the batchmeter S which when the mixing period is completed will again actuate the indicator, repeating the cycle just described.

What I claim and desire to protect by Letters Patent, is:

1. In a concrete mixing machine, a mixing drum, mixing period controlling devices, a charging device for charging aggregates into said drum, a discharging device for emptying the mixture of aggregates from said drum, and an indicator for indicating certain operations of the mixing machine, said indicator being operatively connected to said mixing period controlling device, said charging device, and said discharging device to be progressively actuated thereby.

2. A mixing machine including a mixing drum, charging and discharging devices therefor, a mixing period controlling device for governing the time of mixing of aggregates within the drum, manually controlled devices for initiating operation of said charging and discharging devices, and an indicator mechanism operatively connected to said devices to be successively operated by said devices to indicate subsequent operation of certain of said devices in a desired sequence.

3. In a mixing machine, a supporting frame, a mixing drum thereon, a charging skip therefor, a discharge chute therefor, power actuated manually controlled mechanisms for said skip and said chute, an indicator for indicating in proper sequence certain operations of the manually controlled mechanism, and delayed control devices associated with certain of said power actuated mechanisms and said indicator, producing a retarded operation of said indicator when said mechanisms are operated.

4. In a mixing machine, a mixing drum, a charging skip therefor, a discharge chute therefor, a power operated mechanism for raising said skip under manual control of the operator, an indicator for indicating certain functions of the manual control means, and a plurality of actuating mechanisms for shifting said indicator, cooperating with said skip to shift the indicator to inform the operator to return the discharge chute to non-discharging position and indicate to the operator a proper time to operate the skip.

5. In a mixing machine, a mixing drum, a charging skip therefor, a discharge chute therefor, a power operated mechanism for raising said skip under manual control of the operator, an indicator for indicating certain functions of the manual control means, and a plurality of actuating mechanisms for shifting said indicator, cooperating with the said skip to shift the indicator to inform the operator to move the discharge chute to a certain position and subsequently inform the operator to operate the skip.

6. In a mixing machine, a mixing drum, a charging skip therefor, a discharge chute therefor, a power operated mechanism for raising said skip under manual control of the operator, an indicator for indicating certain functions of the manual control means, a plurality of actuating mechanisms for shifting said indicator, cooperative with the said skip to shift the indicator to inform the operator to return the discharge chute to non-discharging position and subsequently inform the operator to lower the skip, a mixing period control device operated by said skip and provided with a mechanism to actuate said indicator to inform the operator to operate the discharge means, and a mechanism operatively connected to said discharge means causing said indicator to inform the operator to raise the skip.

7. In a concrete mixing machine, in combination, a mixing drum, a charging device for said drum, discharging means for the drum, operating means for the charging device, operating means for the discharging means, a visual indicator, and means for establishing a coaction between said indicator and the mixing machine parts for causing operation of the indicator to advise the operator of the machine to operate the charging device at a certain time, and to advise the operator to operate the discharging means at a certain time.

8. A machine substantially as set forth in claim 7 wherein the indicator operating means acts thereon to present its proper indication to the operator of the machine at times such that the operations of the discharging means and the charging device will be overlapped.

9. Indicating mechanisms of the class described, comprising, in combination, a roller, indicia on said roller for indicating operations to be performed by the operator of a paving machine mechanism and causing said roller to be turned so that the proper indication becomes evident at the proper time consisting of a pivotally mounted lever, connections between one end of the lever and the roller so that each actuation of the lever in one direction causes the roller to make a partial revolution in the same direction, and connections between the other end of the lever and certain instrumentalities of a paving machine whereby the lever is actuated incident to certain movements of these said instrumentalities.

10. Indicating mechanisms of the class described, comprising, in combination, a carrier member rotatably mounted in the casing, indicia means on the carrier member disposed so that only one indicator at a time is visible to the operator of a machine on which the device is mounted, and means for successively bringing the indications into the position wherein they may be viewed by the operator, consisting of a lever pivotally mounted on the casing, a bell crank pivotally mounted, a connection between one end of the lever and the bell crank connections between the other end of the bell crank and the carrier member which are disengageable with respect to the carrier member and effective to set up a connection between the bell crank and the carrier member only when the latter is to be moved in one direction by the bell crank, and means for actuating the lever incident to certain operations of the machine on which the device is mounted.

11. Indicating mechanisms of the class described, comprising, in combination, indicating means for indicating certain operations to be performed in a mixing machine, and mechanism for causing proper operation in the indicating means, consisting of a cable, instrumentalities associated with the cable for causing proper operation of the indicating means incident to a pull on the cable, said instrumentalities including resilient means for returning the cable to its former position subsequent to each pull being applied thereto, a device for putting a tension on the cable incident to operations of the discharging device of the machine on which the indicator is mounted, said first mentioned device including a cam adapted to be engaged and actuated by a part of the discharge device while the latter is operating to assume a discharging position, and connections between the cam and the cable for delaying the transmission of the effective operation of the cam to the cable.

12. Indicating mechanisms of the class described, comprising, in combination, a casing, a carrier member mounted for movement in the casing, indicia carried by the carrier member, instrumentalities for causing movements of indicia whereby certain indicia are brought into effective positions in proper sequential relationship, said instrumentalities including a lever, connections between the lever and the carrier member whereby actuation of the former causes movement of the carrier member, means for actuating the lever incident to the operations of certain mechanisms and devices included in the construction of a mixer, and yielding means for returning the lever to its normal position after each actuation thereof by the mechanisms and devices, said yielding means normally maintaining the lever in a position wherein it is adapted to be actuated by the mechanisms and devices of the mixer.

13. Indicating mechanisms of the class described, comprising, in combination, an indicating roller having suitable indicia thereon to indicate proper sequential operations of a mixing machine, instrumentalities for imparting to the roller a partial revolution thereof upon each operation of the instrumentalities, said instrumentalities including a member adapted to engage the roller to transmit motion thereto when the said member is moved in one direction but which member does not effectively engage the roller when moved in the opposite direction, means for actuating said member in a direction to cause rotation of the roller incident to operations of said mechanisms and devices included in the mixing machine on which the device is mounted, and means for causing the member to return to its normal position without affecting the roller and which means becomes operative after tension, causing operation of the roller, has been released from the said member.

14. In a mixing machine, a mixing device, a charging device therefor, a discharging device for emptying the mixing device, a time controlling device for governing the period of time the materials are to be mixed within the mixing device, and an indicating device having a plurality of indicating means operatively connected with the time controlling device for indicating a series of subsequent operations of the charging and discharging devices.

15. In a mixing machine, a mixing device, charging and discharging devices therefor, a time controlling mechanism for the mixing device, and an indicator of different actions of the machine operatively connected to the time-controlling device, and means to bring into use in proper timed relation, and progressively, different indications to advise the operator of certain subsequent operations of the charging and discharging devices.

In testimony whereof I affix my signature.
JOHN F. ROBB.